United States Patent
Ponnampalam et al.

(10) Patent No.: US 8,391,390 B2
(45) Date of Patent: Mar. 5, 2013

(54) METHODS AND APPARATUS FOR DETERMINING BEAMFORMING TRANSFORMATIONS FOR EACH OF A PLURALITY OF SUBCARRIERS IN A MIMO COMMUNICATIONS CHANNEL

(75) Inventors: Vishakan Ponnampalam, Bristol (GB); Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1273 days.

(21) Appl. No.: 12/052,405

(22) Filed: Mar. 20, 2008

(65) Prior Publication Data

US 2008/0311859 A1    Dec. 18, 2008

(30) Foreign Application Priority Data

Mar. 20, 2007    (GB) .................................. 0705343.2

(51) Int. Cl.
*H04B 7/02*    (2006.01)
*H04L 1/02*    (2006.01)

(52) U.S. Cl. ......................................... 375/267; 455/69
(58) Field of Classification Search .................. 375/267, 375/260, 262, 224, 296; 370/343, 341
See application file for complete search history.

(56) References Cited

U.S. PATENT DOCUMENTS

| | | | |
|---|---|---|---|
| 6,658,234 B1 | 12/2003 | Doğan et al. | |
| 7,302,231 B2* | 11/2007 | Sun | 455/63.1 |
| 7,346,115 B2* | 3/2008 | Howard et al. | 375/260 |
| 7,349,667 B2* | 3/2008 | Magee et al. | 455/63.4 |
| 7,486,655 B2* | 2/2009 | Ting et al. | 370/343 |
| 7,636,406 B2* | 12/2009 | Leshem et al. | 375/347 |
| 7,714,781 B2* | 5/2010 | Xia et al. | 342/370 |
| 2007/0116143 A1* | 5/2007 | Bjerke et al. | 375/262 |
| 2007/0167192 A1* | 7/2007 | Li et al. | 455/562.1 |
| 2011/0274209 A1* | 11/2011 | Khojastepour | 375/296 |

FOREIGN PATENT DOCUMENTS

| | | |
|---|---|---|
| EP | 1 672 824 A1 | 6/2006 |
| WO | WO 01/48944 A1 | 7/2001 |

OTHER PUBLICATIONS

Cong Shen and Michael P. Fitz, MIMO-OFDM Beamforming for Improved Channel Estimation, 2006, IEEE GLOBECOM 2006 proceedings.*

Pangan Ting, Chao-Kai Wen, Jiunn-Tsair Chen, An Efficient CSI Feedback Scheme for MIMO-OFDM Wireless Systems, 2007 IEEE Transactions on Wireless Communications, vol. 6, No. 6, Jun. 2007.*

* cited by examiner

*Primary Examiner* — David C. Payne
*Assistant Examiner* — Bahman Badipour
(74) *Attorney, Agent, or Firm* — Oblon, Spivak, McClelland, Maier & Neustadt, L.L.P.

(57) ABSTRACT

Channel estimation in a MIMO communications system includes performing a decomposition of an initial channel matrix estimate associated with a first subcarrier of a plurality thereof defined in the channel to identify eigenvectors associated with that subcarrier of the received signal, and defining a first beamforming transformation to be applied to the received signal on the basis of the eigenvectors. For each of the other subcarriers, an additional decomposition is performed in order to determine a further beamforming transformation for each subcarrier. The additional decompositions are carried out incrementally such that information determined in one of said decompositions contributes to a later executed decomposition. Further described is a method of transmitting from a multiple antenna transmitter defining a plurality of subcarriers in space, and time or frequency, comprising the same iterative process. Transmission can be carried out using smoothed beamforming applied in accordance with aspects of the invention.

18 Claims, 5 Drawing Sheets

METHODS AND APPARATUS FOR DETERMINING BEAMFORMING TRANSFORMATIONS FOR EACH OF A PLURALITY OF SUBCARRIERS IN A MIMO COMMUNICATIONS CHANNEL

CROSS REFERENCE TO RELATED APPLICATIONS

This application claims priority Under 35 U.S.C. §119 to UK Application No. 0705343.2 filed Mar. 20, 2007, the entire contents of which are incorporated by reference herein.

BACKGROUND OF THE INVENTION

1. Field of the invention

The invention is concerned with wireless communications apparatus, and particularly with wireless communications apparatus employing precoding and/or beamforming.

2. Discussion of Background

MIMO communications equipment can use beamforming techniques to improve efficacy of communication. Beamforming uses interference effects at multiple antennas such that the superimposed signals at the individual antennas give rise to a directional beam, or a beam of desired profile given operating conditions.

In systems employing precoding or beamforming, channel knowledge is used at the transmitter in order to enhance the link quality. In an OFDM system, a precoding matrix is applied to each individual subcarrier. The matrix governs the weights allocated to each spatial channel, to cause formation of a desired beam profile. The optimal weights are found from the singular value decomposition (SVD) of the channel. This is described in "Limited feedback precoding for spatial multiplexing systems" (D. J. Love and R. W. Heath, Jr, Globecom 2003, pp 1857-1861). In an OFDM system, the SVD needs to be computed on every subcarrier, which may be costly.

There are several available techniques for computation of the SVD. Hessenberg decomposition, described in "Linear algebra and its applications" (G. Strang, Harcourt-Brace-Jovanovich, $3^{rd}$ ed., 1986), Hestenes method described in "Inversion of matrices by biorthogonalization and related results" (M. Hestenes, Journal of the Society for Industrial and Applied Mathematics, vol 6, no 1, pp 51-90, March 1958), and different types of eigenvalue decomposition (again, Strang, referenced above), are commonly employed.

SUMMARY OF THE INVENTION

An aspect of the invention provides a method of processing a signal received from a multiple element antenna, to estimate a MIMO communications channel, comprising, performing a decomposition of an initial channel estimate associated with a first subcarrier of a plurality thereof defined in the channel to identify eigenvectors associated with that subcarrier of the received signal, and defining a first beamforming transformation to be applied to the received signal on the basis of the eigenvectors then, for each of the other subcarriers, performing an additional decomposition in order to determine a further beamforming transformation for each of said one or more other subcarriers, wherein said additional decompositions are carried out incrementally such that information determined in one of said decompositions contributes to a later executed decomposition.

Concerning this, smooth beamforming may be brought about by employing an aspect of the invention to perform incremental beamforming. This approach can give rise to an obviation of the need to perform SVD's independently for each subcarrier and then apply a post-processing technique in order to make the beamforming smooth, which would otherwise be computationally complex and potentially unreliable.

The invention can also be incorporated into a pipelined architecture, which offers advantages of processing efficiency.

A further aspect of the invention provides a method of transmitting from a multiple antenna transmitter defining a plurality of subcarriers in space, and time or frequency, comprising applying to a first of said subcarriers a beamforming transformation, said beamforming transformation being determined by performing a decomposition on channel estimate information for said first subcarrier to determine eigenvectors for said first subcarrier, and applying to two or more further of said subcarriers, further beamforming transformations, said further beamforming transformations each being determined by performing an additional decomposition, wherein said additional decomposition is carried out incrementally such that information determined in one of said decompositions contributes to a later executed decomposition.

A further aspect of the invention provides a signal processor for processing a signal received from a multiple element antenna, to estimate a MIMO communications channel, comprising means for performing a decomposition of an initial channel estimate associated with a first subcarrier of a plurality thereof defined in the channel to identify eigenvectors associated with that subcarrier of the received signal, and for defining a first beamforming transformation to be applied to the received signal on the basis of the eigenvectors and means for performing, for each of the other subcarriers, an additional decomposition in order to determine a further beamforming transformation for each of said one or more other subcarriers, wherein said means for performing additional decompositions is operable on each of said one or more other subcarriers incrementally such that information determined in one of said decompositions contributes to a later executed decomposition.

A further aspect of the invention provides a MIMO transmitter operable to transmit in a channel defining a plurality of subcarriers in space, and time or frequency, comprising means for applying to a first of said subcarriers a beamforming transformation, including means for determining said beamforming transformation by performing a decomposition on channel estimate information for said first subcarrier to determine eigenvectors for said first subcarrier, and means for applying to two or more further of said subcarriers, further beamforming transformations, including means for determining each of said further beamforming transformations by performing an additional decomposition, wherein said means for determining each of said further beamforming transformations is operable to apply an additional decomposition incrementally to each of said further subcarriers such that information determined in one of said decompositions contributes to a later executed decomposition.

A receiver can be constructed with the signal processor described above.

A MIMO transceiver can be constructed with the channel estimation capabilities described above, and with the transmitter described above.

Aspects of the invention can be implemented in hardware, or software, or a combination of the two. It will be appreciated that a computer program can be delivered in a number of ways, Such as on a computer readable medium, such as an optical and/or a magnetic disk, or as a file stored on a mass storage device such as a flash memory, or on a signal either communicated to a mobile terminal using the provided communications channel, or by way of a secondary signal receiving means such as via short range signalling systems for example infra-red or Bluetooth.

Aspects of the invention provide wireless terminals, base stations, access points including means for delivering at least one of the inventive concepts disclosed herein.

DETAILED DESCRIPTION OF EMBODIMENTS.

Figure 1:
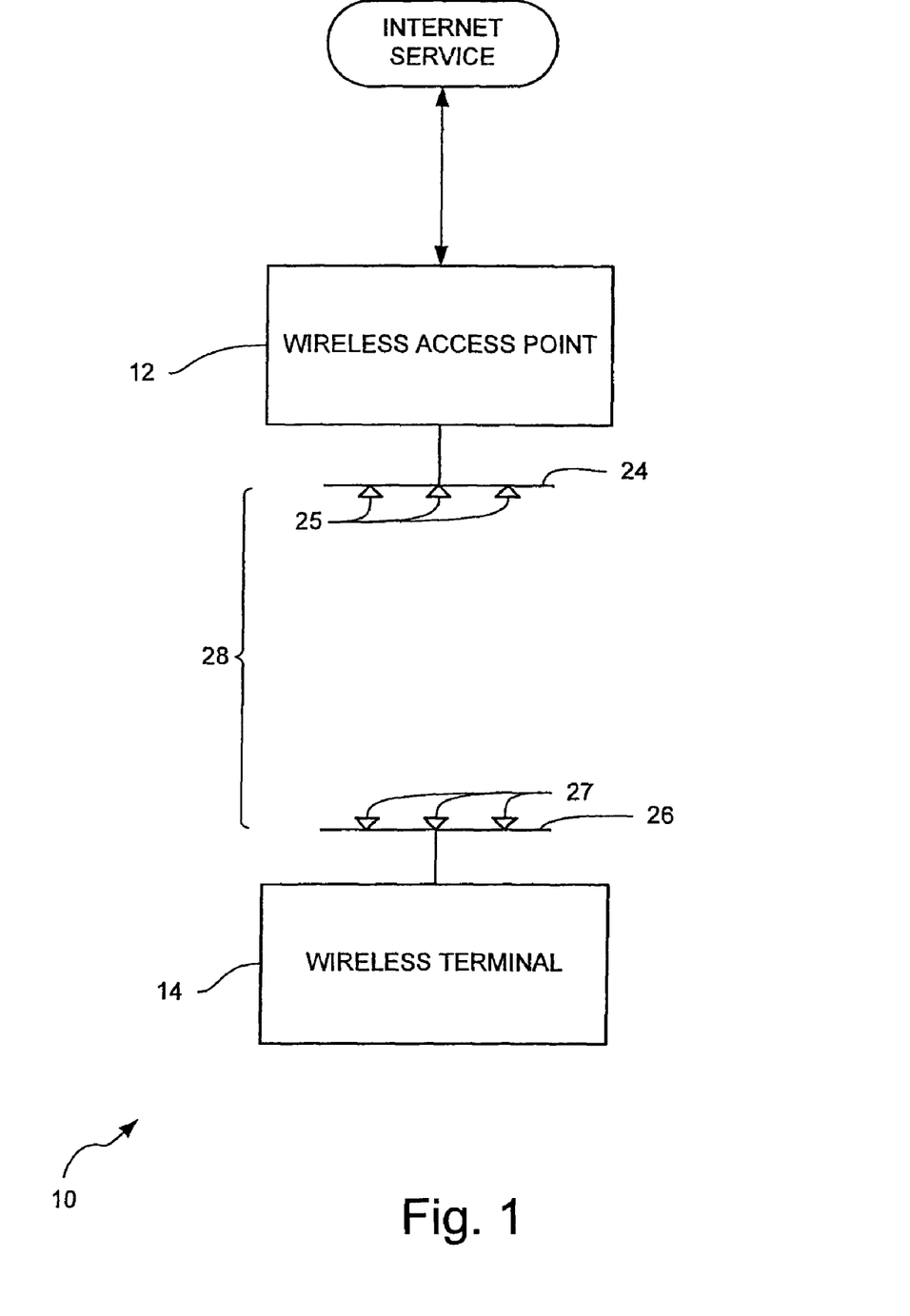
FIG. 1 is a schematic diagram of a MIMO communications system in accordance with a specific embodiment invention, including an access point and a terminal.

The present invention will now be described with reference to an implementation thereof for the equalization of a wireless communication system. FIG. 1 illustrates such a system, comprising a MIMO data communications system 10 of generally known construction. New components, in accordance with a specific embodiment of the invention, will be evident from the following description.

The communications system 10 comprises a wireless access point 12 and a wireless terminal 14. The wireless access point 12 provides access to an internet service as illustrated.

The wireless access point 12 comprises an antenna array 24 comprising a plurality of antennas 25. In this illustrated example, three antennas 25 are provided, though practical implementations may include more, or less antennas depending on the application. Further, the wireless terminal 14 comprises a plurality of receive antennas 27. In this specific embodiment, the receive antenna array 26 comprises three receive antennas 27. Between these antenna arrays 24, 26, a MIMO channel 28 is defined The access point 12 is illustrated in further detail in FIG. 2. It will be appreciated that, in many practical implementations of the described embodiment, this will be brought into effect by way of a software implementation on hardware. The functional blocks in FIG. 2 however provide teaching to the skilled person of processing stages provided in such a device to establish wireless communication.

Figure 2:
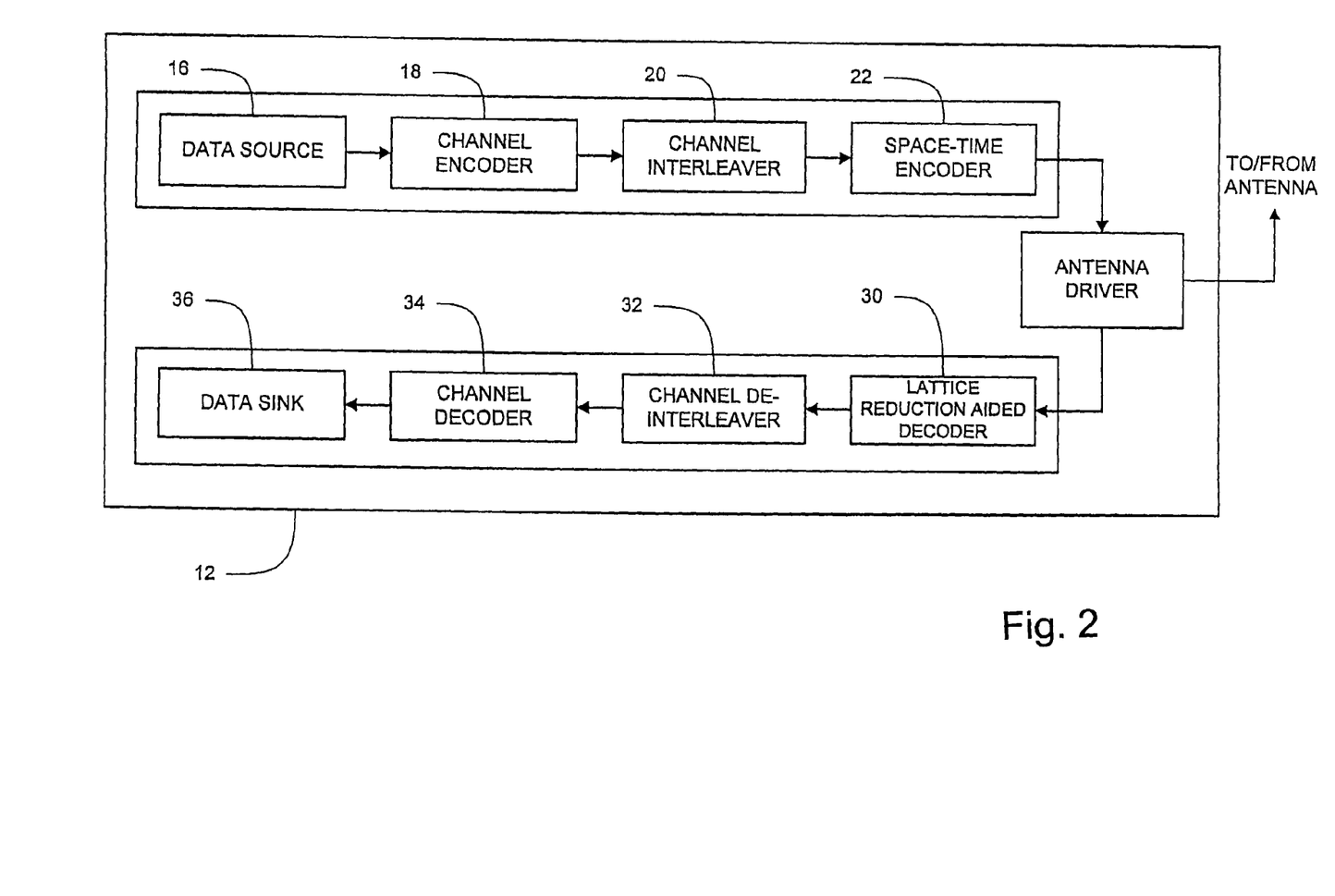
FIG. 2 is a schematic diagram of the wireless access point illustrated in FIG. 1.

The access point 12 is illustrated as having two main functional elements, namely a transmit pathway and a receive pathway, the former being from a data source 16, which provides data (comprising information bits or symbols) for communication, and the latter a data sink 36 for processing of the data in any desired manner. It will be appreciated that the handling of data, at a data level, is not part of this invention and that the data can be for any practical use. Further, the data can be from storage facilities on the access point itself or from external sources such as from internet communication.

Data from the data source 16 is passed to a channel encoder 18. The channel encoder 18 is followed by a channel interleaver 20 and, in the illustrated example, a space-time encoder 22. The space-time encoder 22 encodes an incoming symbol or symbols as a plurality of code symbols for simultaneous transmission from the transmitter antenna array 24.

Received encoded transmitted signals, which have propagated through the MIMO channel 28 are passed to a lattice-reduction-aided decoder 30 which has the task of removing the effect of the MIMO channel 28. The output of the lattice-reduction-aided decoder 30 comprises a plurality of signal streams, one for each transmit antenna 25, each carrying so-called soft or likelihood data on the probability of a transmitted bit having a particular value. This data is provided to a channel de-interleaver 32 which reverses the effect of the channel interleaver 20, and the de-interleaved bits output by this channel de-interleaver 32 are then presented to a channel decoder 34, in this example a Viterbi decoder, which decodes the convolutional code. The output of channel decoder 34 is provided to the data sink 36, for further processing of the data in any desired manner.

It will be appreciated that, though in this example, a reduced lattice aided detector 30 is employed, any approach to MIMO detection can also be used, involving space-time detection.

The specific function of the lattice-reduction-aided decoder 30 will be described in due course.

Figure 3:
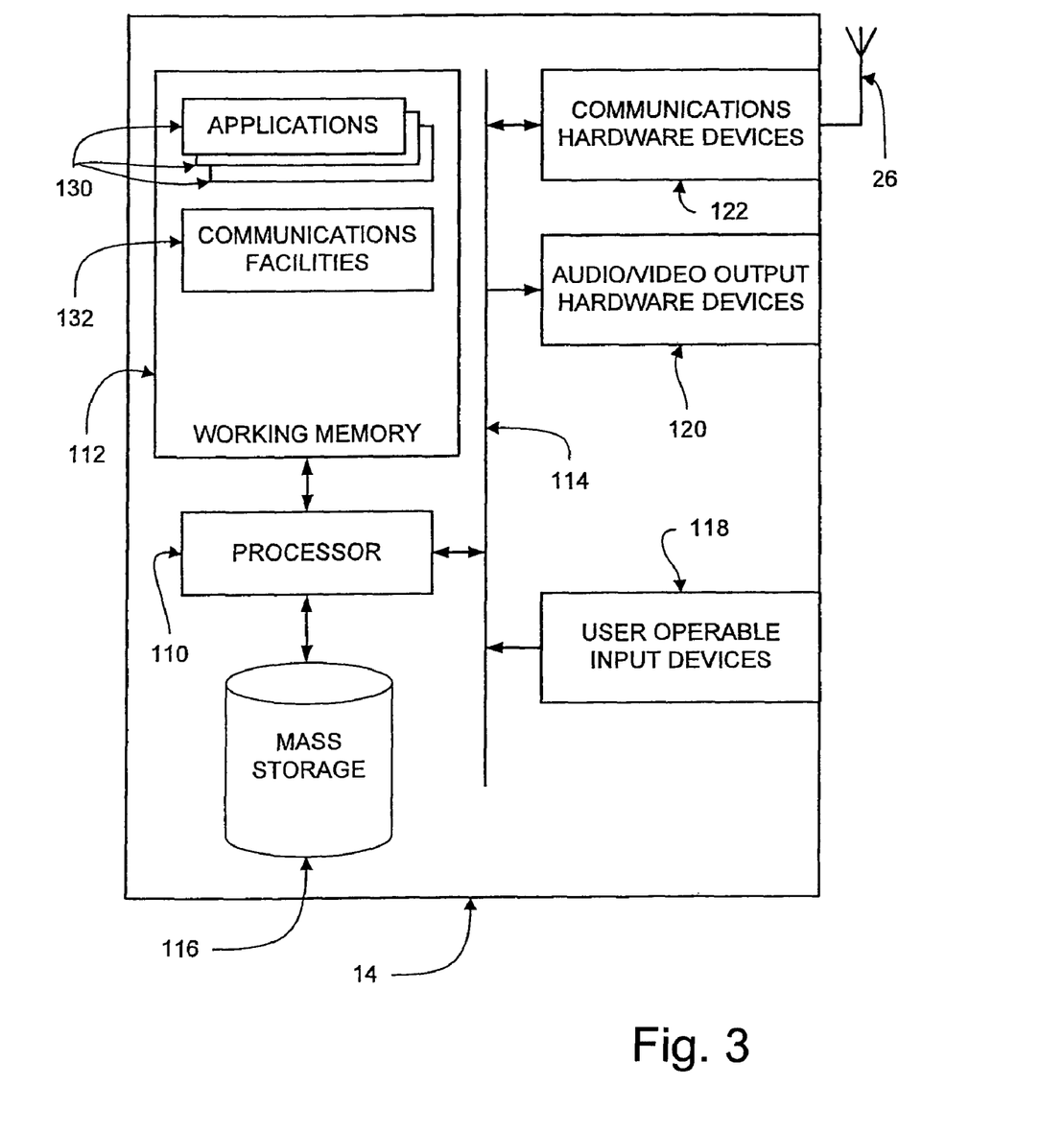
FIG. 3 is a schematic diagram of the terminal illustrated in FIG. 1.

FIG. 3 illustrates schematically hardware operably configured (by means of software or application specific hardware components) as the wireless terminal 14. The wireless terminal 14 comprises a processor 110 operable to execute machine code instructions stored in a working memory 112 and/or retrievable from a mass storage device 116. By means of a general purpose bus 114, user operable input devices 118 are capable of communication with the processor 110. The user operable input devices 118 comprise, in this example, a keyboard and a mouse though it will be appreciated that any other input devices could also or alternatively be provided, such as another type of pointing device, a writing tablet, speech recognition means, or any other means by which a user input action can be interpreted and converted into data signals.

Audio/video output hardware devices 120 are further connected to the general purpose bus 114, for the output of information to a user. Audio/video output hardware devices 120 can include a visual display unit, a speaker or any other device capable of presenting information to a user.

Communications hardware devices 122, connected to the general purpose bus 114, are connected to the antenna 26. In the illustrated embodiment in FIG. 3, the working memory 112 stores user applications 130 which, when executed by the processor 110, cause the establishment of a user interface to enable communication of data to and from a user. The applications in this embodiment establish general purpose or specific computer implemented utilities that might habitually be used by a user.

Communications facilities 132 in accordance with the specific embodiment are also stored in the working memory 112, for establishing a communications protocol to enable data generated in the execution of one of the applications 130 to be processed and then passed to the communications hardware devices 122 for transmission and communication with another communications device. It will be understood that the software defining the applications 130 and the communications facilities 132 may be partly stored in the working memory 112 and the mass storage device 116, for convenience. A memory manager could optionally be provided to enable this to be managed effectively, to take account of the possible different speeds of access to data stored in the working memory 112 and the mass storage device 116.

On execution by the processor 110 of processor executable instructions corresponding with the communications facilities 132, the processor 110 is operable to establish communication with another device in accordance with a recognised communications protocol. Between the communications facilities 132, the processor 110 and the communications hardware devices 122, the wireless terminal 14 is configured to provide facilities as in the wireless access point for the establishment of transmission and reception of data over the MIMO channel 28.

It will be appreciated that the wireless access point 12 has been described in functional detail, although the wireless terminal will have equivalent function.

Figure 4:
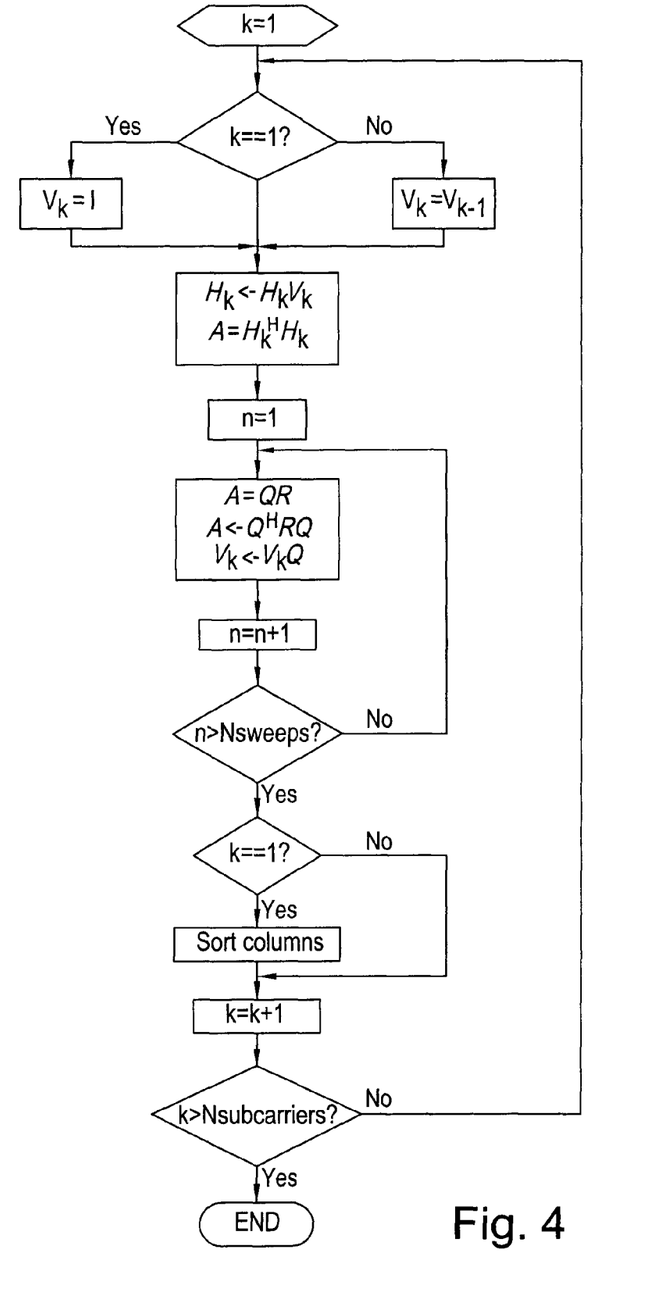
FIG. 4 is a flow diagram illustrating a beamforming transformation derivation process performed by either the wireless access point or the terminal, both illustrated in FIG. 1.

The lattice-reduction-aided decoder 30 of the wireless access point will now be described in further detail, with reference to FIGS. 4 and 5 of the drawings. The lattice-reduction-aided decoder 30 takes the form of a beamformer, that is it defines the emphasis given to specific ones of the antenna elements, to determine the received signal associated with a specific beam direction.

By way of background, an optimal beamformer for a MIMO channel H is its right singular vectors, as described in Love et al., referred to above. That is, if $H=USV^H$ then the beamformer is V. The columns of V are ordered according to decreasing singular values.

If there are fewer data streams K than transmit antennas M, the first K columns of V are used. It should be noted that the singular vectors V of H are the same as the eigenvectors of $H^H H$ since $H^H H = VS^H U^H USV^H = VS^H SV^H = VDV^H$, where $D=S^H S$. Hence V may be determined by computing the eigenvectors of $H^H H$ instead of the right singular vectors of H.

To compute the eigenvectors, the repeated QR algorithm described in Strang is used. This finds the eigenvectors by computing the QR decomposition and reversing the product.

This approach commences off with $A_0 = A$ and then computes $A_0 = Q_0 R_0$.

$A_1$ is then formed as $A_1 = R_0 Q_0 = Q_0^H A_0 Q_0$ and then another QR decomposition is performed. Eventually the series $A_k = R_{k-1} Q_{k-1} = Q_{k-1}^H A_{k-1} Q_{k-1}$ will converge to a diagonal matrix containing the eigenvalues. The eigenvectors are then found as the product $Q_1 Q_2 \ldots Q_k$.

If an initial estimate of $\hat{V}$ of the eigenvectors is available, this can be used to form $A_1 = \hat{V}^H A_H \hat{V}$ to speed up the convergence. It should be noted that, if $\hat{V}$ are the exact eigenvectors of A, then $\hat{V}^H A_0 \hat{V}$ is diagonal and the processor performing this process will identify that the process has converged to its final state.

It should be noted that most methods to compute the SVD operate in an iterative fashion, similar to the repeated QR algorithm. Hence it is possible to apply the same incremental technique to these algorithms, which will reduce complexity and make the beamformed channel smoother.

By using the correlation between neighbouring channels (and SVD computations), the presently described specific embodiment can formulate an efficient way of computing the SVD. In the following, the channel on subcarrier k is denoted by $H_k$ (note that the invention also covers cases where channels are correlated in, e.g., time as well).

- $A = H_1^H H_1$, $V_1 = I$
- for n = 1 : Nsweeps
    - QR decomposition A = QR
    - Update A ← $Q^H A Q$
    - Update beamformer $V_1$ ← $V_1 Q$
- end -continued

- sort columns of $V_1$ according to the diagonal values of A
- for k = 2 : Nsubcarriers
    - $A = V_{k-1}^H H_k^H H_k V_{k-1}$, $V_k = V_{k-1}$
    - for n = 1 : Nsweeps
        - QR decomposition A = QR
        - Update A ← $Q^H A Q$
        - Update beamformer $V_k$ ← $V_k Q$
    - end
- end It should be noted that the number of loops in the eigenvalue decomposition is denoted Nsweeps and that the eigenvectors from the previous subcarrier are used as the initial guess ($V_k = V_{k-1}$). The parameter Nsweeps can be set to any value but it will be shown later that setting Nsweeps=1 has many advantages.

It will also be noted that sorting is necessary after the first eigenvector computation, as the order would otherwise be random. The columns of $V_1$ should be sorted in descending order according to the eigenvalues, which are roughly the diagonal of A. Once this initial sorting has been done, no sorting is necessary for the subsequent processing (in fact it may be detrimental to the smoothness). The algorithm is shown as a flowchart in FIG. 4. By way of explanation, the two sections of the above algorithm have been overlaid in the flow diagram to take advantage of functional equivalence of steps between the sections.

This incremental approach can be applied to any iterative SVD computation method, not just the repeated QR algorithm, although the skilled reader will appreciate that certain minor modifications may be required depending on the computation method employed. It is also worth noting that the SVD does not have to be computed on every subcarrier or time slot. It is possible to compute it on every N:th channel and to interpolate between the results, for example with simple linear interpolation or more advanced techniques such as described in "Interpolation based unitary precoding for spatial multiplexing MIMO-OFDM with limited feedback" (J. Choi, B. Mondal, R. W. Heath, Jr., IEEE Trans. Sig. Proc., vol 54, no 12, pp 4730-4740, December 2006).

Apart from reducing complexity, an additional benefit of performing this incremental computation is that the beamformer will maintain smoothness. If the SVD is computed independently on every subcarrier, there is no guarantee that the beamforming weights will have any continuity across the subcarriers. This can be severely detrimental if advanced channel estimation techniques are used, which require the beamformed channel to be smooth.

The above algorithm can easily be implemented in a pipelined structure, allowing for a highly efficient architecture.

To demonstrate the performance of this described embodiment, comparisons have been performed between a "full SVD" algorithm and an algorithm modelling the present embodiment, using the Matlab tool. The "full SVD" tool uses highly advanced linear algebra packages, and can be taken to be the exact SVD. It is computed independently on each subcarrier. The IEEE802.11n system (IEEE P802.11n, "Part 11: Wireless LAN medium access control (MAC) and physical layers (PHY) specifications", D1.10, January 2007, http://www.802wirelessworld.com) has been used to evaluate the performance, which is an OFDM system with 56 active subcarriers.

The simulations are done with 3 Tx, 3 Rx antennas (as in the illustrated embodiment) and two data streams with 64QAM modulation and 5/6 code rate (MCS 15) and all impairments (see IEEE802.11n) turned on. These impairments include PA non-linearity, frequency offset and phase noise. Channel model E (see "TGn channel models" E. Vinko et al, IEEE 802.11-03/940r4, May 2004) was used in the simulation as it is the most frequency-selective and hence the most challenging case for smooth beamforming.

Figure 5:
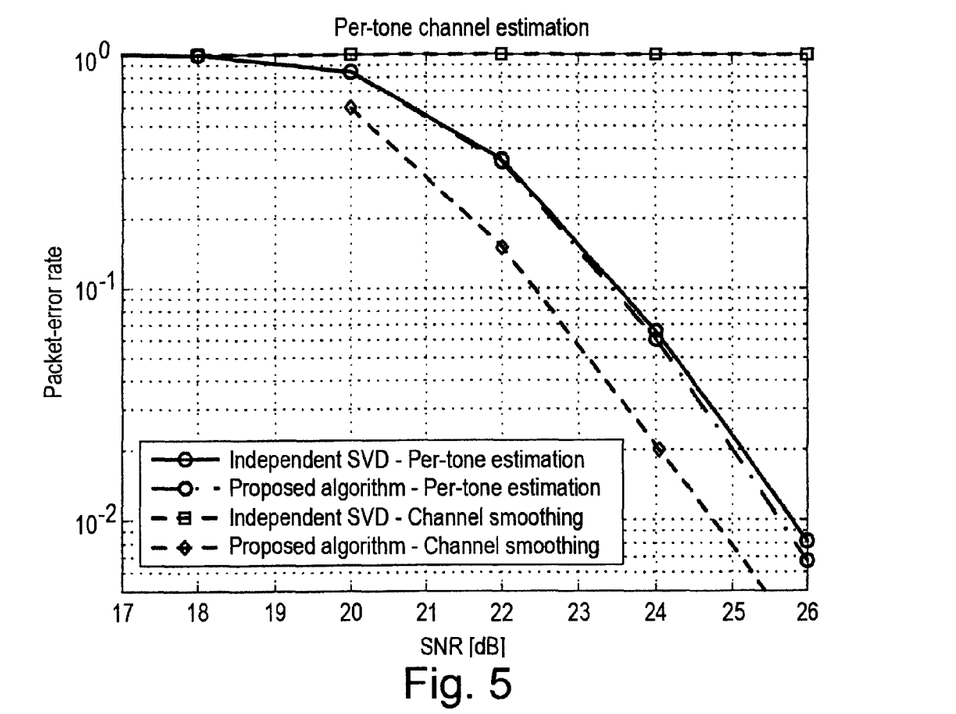
FIG. 5 is a graph of performance of computer simulations of examples of the specific embodiment and other prior art examples, in terms of packet error rate against signal to noise ratio.

In FIG. 5, the packet-error rate is shown when using Nsweeps=1 loop in the eigenvector computation. With per-tone channel estimation, the performance is identical to that of the "full SVD" computed by Matlab. Hence one sweep is sufficient to get maximum performance. When channel smoothing is used at the receiver, the proposed algorithm has about 1 dB gain while the independently computed SVD fails completely. This is due to discontinuities that are introduced by not ensuring a smooth beamformer. Note that in the graph, for simplicity, the simulation in accordance with the specific embodiment of the invention is described as the 'proposed algorithm'. This is not intended to imply any uncertainty as to the existence or completeness of the algorithm in the present disclosure.

Figure 6:
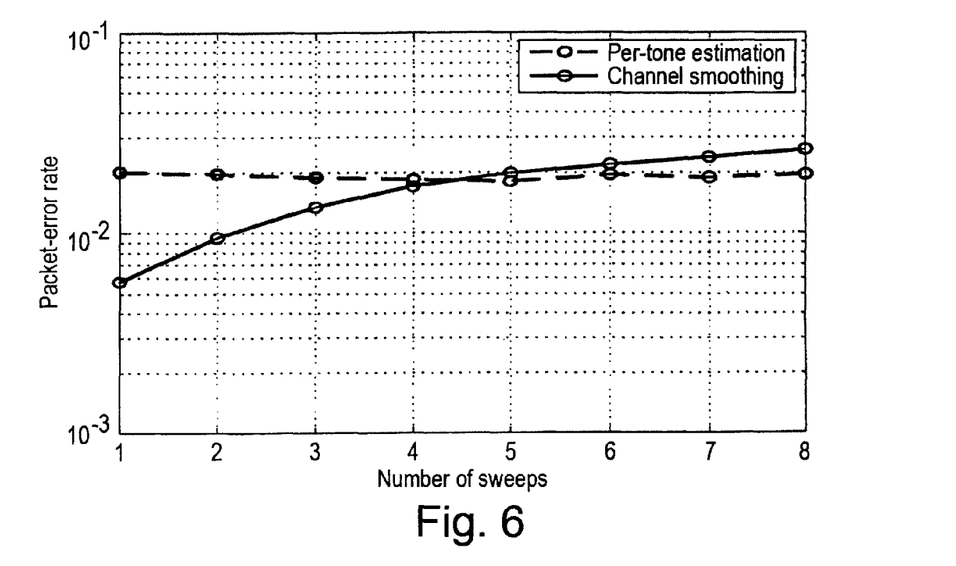
FIG. 6 is a graph illustrating results of computer simulations performed on examples of the specific embodiment of the invention.

In FIG. 6, the performance is shown as a function of Nsweeps when the SNR=25 dB. When per-tone channel estimation is used, there is no benefit by increasing the number of sweeps. However when channel smoothing is used, the performance degrades when Nsweeps is increased. This is due to the larger changes in beamforming weights between two subcarriers, which causes the beamformed channel to be less smooth.

In this example, it is established that one sweep is most operationally desirable since it is sufficient to compute the beamforming weights, while at the same time ensuring smoothness. For other systems and parameters, the value might be different but it shows that a fixed value can be found that optimally trades off beamforming, performance and smoothness.

The above disclose establishes that finding beamforming weights from the singular value decomposition (SVD) can be a computationally intensive task in communications systems. This disclosure describes a simple method to make use of the correlation between channels to reduce the complexity of the SVD computation. By using an incremental technique, the computations can commence from an initial estimate (or even a guess), which means that useful results can be produced with fewer iterations. A further advantage of aspects of this disclosure is that it produces a smooth beamformer, i.e., the channel after beamforming is suitable for advanced channel estimation techniques in the receiver. If a non-incremental approach is used, channel smoothing techniques cannot be used to improve performance.

The aspects of the invention described herein make use of the fact that, although the SVD calculation itself is relatively well understood, most approaches don't make use of the fact that neighbouring channels are often highly correlated, which has been found to simplify the corresponding SVD calculations. Furthermore, the resultant beamforming will change the channel characteristics; for example, the frequency correlation of the beamformer channel in an OFDM system will be significantly different from that of the original channel. This may prevent advanced channel estimation techniques, such as channel smoothing, from obtaining performance gains. The present disclosure offers implementations which may deal with both these issues and may obtain a smooth beamformer at reduced complexity.

Further aspects and advantages of the invention will be appreciated by the skilled reader. Nothing in the foregoing should be read as a limitation on the scope of protection sought, which is set out in the accompanying claims.

The invention claimed is:

1. A method of processing a signal received from a multiple element antenna, to estimate a MIMO communications channel comprising:
performing a decomposition of an initial channel estimate associated with a first subcarrier of a plurality of subcarriers defined in the channel to estimate eigenvectors associated with that first subcarrier of the received signal, wherein performing the decomposition comprises carrying out an iterative procedure used to converge on an estimate for the eigenvectors;
defining a first beamforming transformation to be applied to a future transmitted signal on the basis of the estimated eigenvectors;
for each of the other subcarriers, performing an additional decomposition comprising an iterative procedure in order to determine a further beamforming transformation for each of said one or more other subcarriers,
wherein said additional decompositions are carried out incrementally, and for each subcarrier the final estimate obtained from the iterative procedure is used as an initial guess in the iterative procedure for the next subcarrier, such that information determined in one of said decompositions contributes to a later executed decomposition.

2. A method in accordance with claim 1 wherein a first of said additional decompositions is performed on the basis of the beamforming transformation determined for the first subcarrier.

3. A method in accordance with claim 1 wherein the first decomposition is a QR decomposition.

4. A method in accordance with claim 3 wherein said QR decomposition is repeated from an initial estimate.

5. A method in accordance with claim 4 wherein said QR decomposition is repeated until a terminal condition is reached.

6. A method in accordance with claim 5 wherein said terminal condition comprises a maximum number of repetitions of said decomposition or identification of said eigenvectors to within a level of confidence.

7. A method in accordance with claim 1 wherein said additional decomposition is a QR decomposition.

8. A method in accordance with claim 7 wherein said QR decomposition is performed on a matrix representing a channel estimate for the subcarrier concerned transformed by a beamforming transformation derived for a previously considered subcarrier.

9. A method in accordance with claim 8 wherein said matrix represents a channel estimate for the subcarrier concerned transformed by a beamforming transformation derived for the immediately previously considered subcarrier.

10. A method in accordance with claim 1 wherein a first of said additional decompositions is preceded by ordering estimated eigenvectors for said first subcarrier on the basis of corresponding estimated eigenvalues, such that said ordered estimated eigenvectors are formed into a matrix for decomposition in said first of said additional decompositions.

11. A method of transmitting from a multiple antenna transmitter defining a plurality of subcarriers in space, and time or frequency, comprising:
applying to a first of said subcarriers a beamforming transformation, said beamforming transformation being determined by performing a decomposition on channel estimate information for said first subcarrier to determine eigenvectors for said first subcarrier, wherein performing the decomposition comprises carrying out an iterative procedure used to converge on an estimate for the eigenvectors, and applying to two or more further of said subcarriers, further beamforming transformations, said further beamforming transformations each being determined by performing an additional decomposition comprising an iterative procedure, wherein said additional decomposition is carried out incrementally and wherein for each subcarrier, the final estimate obtained from the iterative procedure is used as an initial guess in the iterative procedure for the next subcarrier, such that information determined in one of said decompositions contributes to a later executed decomposition.

12. A method in accordance with claim 11 wherein a first of said additional decompositions is performed on the basis of the beamforming transformation determined for the first subcarrier.

13. Signal processing apparatus for processing a signal received from a multiple element antenna, to estimate a MIMO communications channel, comprising:
means for performing a decomposition of an initial channel estimate associated with a first subcarrier of a plurality thereof defined in the channel to identify eigenvectors associated with that subcarrier of the received signal, said means being configured to perform the decomposition by carrying out an iterative procedure used to converge on an estimate for the eigenvectors;
means for defining a first beamforming transformation to be applied to the received signal on the basis of the eigenvectors and
means for performing, for each of the other subcarriers, an additional decomposition comprising an iterative procedure in order to determine a further beamforming transformation for each of said one or more other subcarriers,
wherein said means for performing additional decompositions is operable on each of said one or more other subcarriers incrementally, said means for performing additional decompositions being operable, for each subcarrier, to use the final estimate obtained from the iterative procedure as an initial guess in the iterative procedure for the next subcarrier, such that information determined in one of said decompositions contributes to a later executed decomposition.

14. A multiple antenna transmitter operable to transmit in a channel defining a plurality of subcarriers in space, and time or frequency, comprising:
means for applying to a first of said subcarriers a beamforming transformation, including means for determining said beamforming transformation by performing a decomposition on channel estimate information for said first subcarrier to determine eigenvectors for said first subcarrier said means being configured to perform the decomposition by carrying out an iterative procedure used to converge on an estimate for the eigenvectors, and
means for applying to two or more further of said subcarriers, further beamforming transformations, including means for determining each of said further beamforming transformations by performing an additional decomposition comprising an iterative procedure,
wherein said means for determining each of said further beamforming transformations is operable to apply an additional decomposition incrementally to each of said further subcarriers, said means for performing additional decompositions being operable, for each subcarrier, to use the final estimate obtained from the iterative procedure as an initial guess in the iterative procedure for the next subcarrier, such that information determined in one of said decompositions contributes to a later executed decomposition.

15. A multiple antenna receiver comprising signal processing apparatus in accordance with claim 13.

16. A MIMO transceiver comprising a multiple antenna transmitter operable to transmit in a channel defining a plurality of subcarriers in space, and time or frequency, comprising:
means for applying to a first of said subcarriers a beamforming transformation, including means for determining said beamforming transformation by performing a decomposition on channel estimate information for said first subcarrier to determine eigenvectors for said fist subcarrier said means being configured to perform the decomposition by carrying out an iterative procedure used to converge on an estimate for the eigenvectors, and
means for applying to two or more further of said subcarriers, further beamforming transformations, including means for determining each of said further beamforming transformations by performing an additional decomposition comprising an iterative procedure,
wherein said means for determining each of said further beamforming transformations is operable to apply an additional decomposition incrementally to each of said further subcarriers, said means for performing additional decompositions being operable, for each subcarrier, to use te final estimate obtained from the iterative procedure as an initial guess in the iterative procedure for the next subcarrier, such that information determined in one of said decompositions contributes to a later executed decomposition
and signal processing apparatus in accordance with claim 13.

17. A non-transitory computer readable medium storing processor executable instructions operable, when executed by a general purpose computer, to cause said computer to perform the method of claim 1.

18. A non-transitory computer readable medium storing processor executable instructions operable, when executed by a general purpose MIMO transceiver, to cause said transceiver to perform the method of claim 1, and in addition to cause said transceiver to detect receipt of MIMO signals and to transmit the same in accordance with beamforming, transformations so determined.

* * * * *